No. 835,941. PATENTED NOV. 13, 1906.
A. DUBACH.
CORN PLANTER.
APPLICATION FILED APR. 25, 1906.
2 SHEETS—SHEET 1.
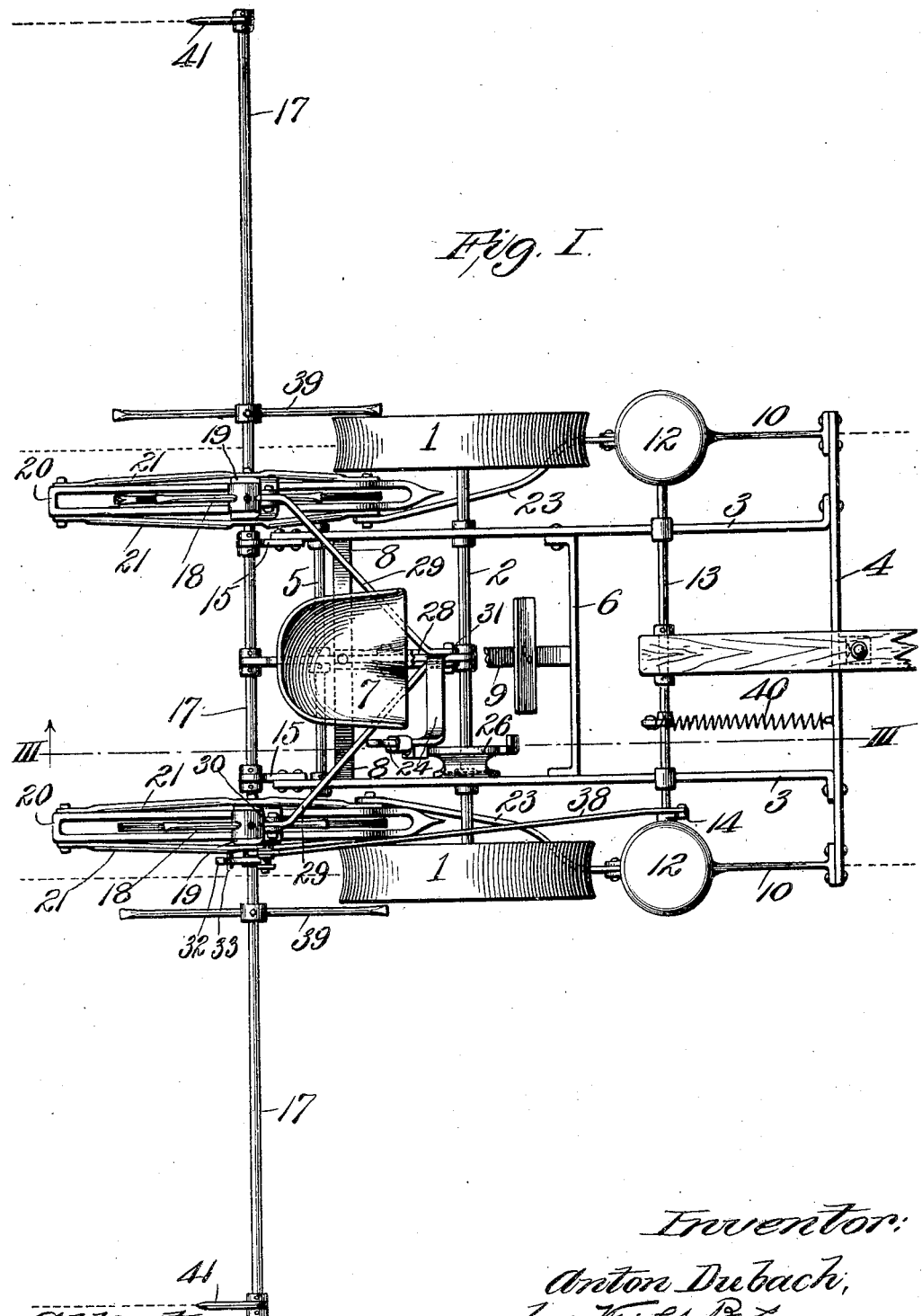
Fig. I.
Inventor:
Anton Dubach,
by Wright Bro
Attys.
Attest:

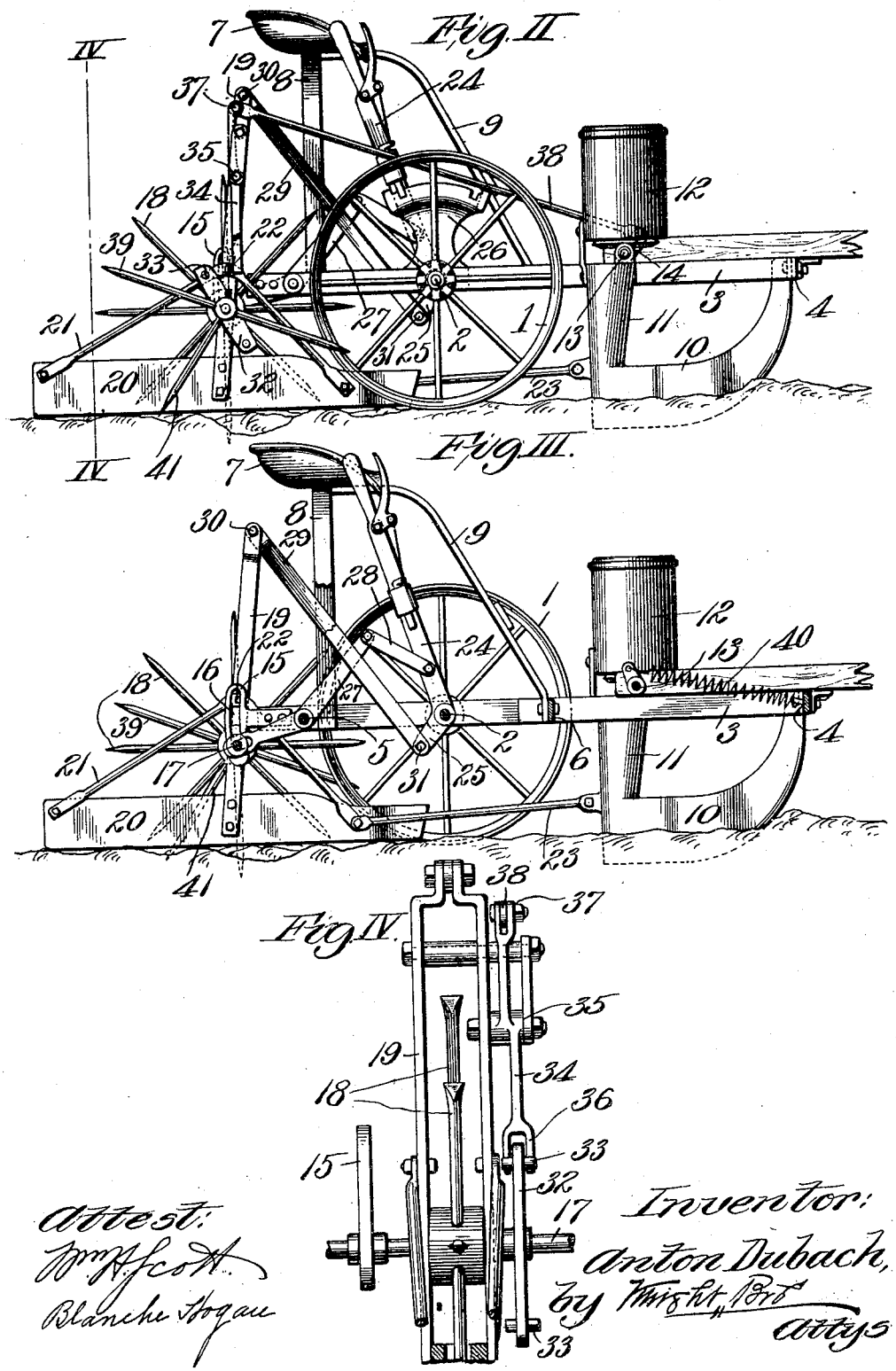

UNITED STATES PATENT OFFICE.

ANTON DUBACH, OF HIGHLAND, ILLINOIS.

CORN-PLANTER.

No. 835,941.   Specification of Letters Patent.   Patented Nov. 13, 1906.

Application filed April 25, 1906. Serial No. 313,640.

*To all whom it may concern:*

Be it known that I, ANTON DUBACH, a citizen of the United States, residing in Highland, in the county of Madison and State of Illinois, have invented certain new and useful Improvements in Corn-Planters, of which the following is a full, clear, and exact description, reference being had to the accompanying drawings, forming part of this specification.

My invention relates to a corn-planter for use without check-wires; and it has for its main object to provide means whereby the spacing-wheels of the dropper-actuating mechanism are caused to move constantly in a horizontal plane, notwithstanding the unevenness of the ground over which they travel.

Figure I is a top or plan view of my corn-planter. Fig. II is a side elevation of the planter. Fig. III is a longitudinal section taken on line III III, Fig. I. Fig. IV is a rear elevation of the trip mechanism and one of the spacing-wheels, the runner and support associated with said spacing-wheel being shown partially in vertical section, taken on line IV IV, Fig. II.

1 designates the ground-wheels of my planter, and 2 the axle to which said wheels are fitted. The main frame of the planter consists of a pair of longitudinal side bars 3, connected by a forward tie-bar 4, a rear tie-rod 5, and an intermediate tie-bar 6.

7 is a seat supported by an inverted-U-shaped support 8, having its arms attached to the frame side bars 3, and a forwardly-extending support 9, attached to the intermediate tie-bar 6.

10 designates furrow-openers attached to the frame of the planter and having seed-receiving chutes 11.

12 designates seedboxes supported by the furrow-openers and provided with valve mechanism of any suitable form.

13 is a valve-operating rod that is suitably connected to the valve mechanism of the seedboxes. This vlave-operating rod is provided with a crank-arm 14. (See Fig. I.)

15 designates a pair of guide-brackets attached to the rear end of the frame of the planter and provided with vertical slots 16.

17 is a shaft loosely fitted in said guide-brackets and adapted to be raised and lowered in the slots thereof, the said shaft being of a length that provides for its extending to each side of the planter a distance equal to or greater than the width of spaces between rows in which the corn is planted during the operation of the planter, the object in so making the shaft being to provide for the application of markers thereto through the medium of which lines may be made in the soil to indicate the path to be followed by the planter after one or more rows have been planted.

18 designates spacing-wheels fixed to the shaft 17 and adapted to travel upon the ground to impart rotation to said shaft.

19 designates vertical carrier-frames which are loosely fitted intermediate of their ends to the shaft 17. The carrier-frames are attached at their lower ends to runners 20, the point of attachment being intermediate of the front and rear ends of the runners.

21 designates stays which are secured intermediate of their ends to the carrier-frames at 22 (see Fig. III) and the arms of which are secured to the runners near their forward and rear ends. The runners 20 are united to the furrow-openers 10 by connecting-rods 23, the forward ends of which are pivoted to said furrow-openers and the rear ends of which are pivoted to said runners, thereby permitting vertical movement of the runners while providing means for the draft thereof.

24 designates a hand-lever that is pivoted to the axle 2 of the planter and is provided with an arm 25. The hand-lever is equipped with a suitable pawl that is adapted to engage a rack 26, carried by the frame of the planter.

27 is a double-armed lever loosely mounted on the tie-rod 5 and one arm of which is provided with a slot in which the shaft 17 fits, whereby upon the upward movement of said lever-arm the shaft may be elevated to raise the spacing-wheels 18 from the ground, during which movement said shaft moves in the slots 16 of the guide-brackets 15. The other arm of the lever 27 is loosely connected to the hand-lever 24 by a link 28, that serves to operate the lever 27 when the hand-lever 24 is rocked and causes the lever 27 to raise and lower the shaft 17 and the parts carried thereby.

29 designates stay-rods, each having one of its ends pivoted at 30 to a corresponding carrier-frame 19 and its other end pivoted at 31 to the arm 25 of the hand-lever 24. These stay-rods serve to maintain the carrier-frames in upright positions, whereby said carrier-frames are caused to hold the runners 20 in horizontal planes in order that when said runners are traveling upon the ground they will always be kept in level positions. The stay-rods 29 also serve as lifting members for the carrier-frames and the runners attached thereto. The runners 20 have the function of supporting the spacing-wheels 18 to prevent said wheels from downward movement when depressions in the ground are encountered, thereby avoiding an uneven degree of travel of the spacing-wheels and uneven planting action which would result due to movement of the wheels out of a horizontal line.

32 designates a trip member fixed to the shaft 17 and provided with studs or pins 33.

34 is a double-armed rocker pivoted at 35 to one of the carrier-frames 19 and one of the arms of which is provided with a fork 36, adapted to be engaged by the studs or pins of the trip member 32. The other arm of said rocker has pivoted to it at 37 a connecting-rod 38, which leads to the crank-arm 14, carried by the seedbox-valve-operating shaft 13.

39 designates marker-fingers carried by the shaft 17 and adapted to move into contact with the ground at intervals corresponding to the spacing of the hills of corn being planted. The marker-fingers 39 are adapted to rotate with the shaft 17 and the spacing-wheels fixed thereto, and each time that one of said fingers moves into the ground it acts with a shoveling action therein to displace the soil and form a depression or mark therein that will indicate the point at which the grain has been dropped, the mark being produced accurately, whereby the operator of the planter may determine in planting the subsequent rows that the cross-rows are constantly maintained in alinement with each other, this information being gained by observation as to whether or not the marker-fingers move to the ground in alinement with the marks previously made by them in the other rows. The marker-fingers are of particular advantage at the ends of the rows in that they enable the operator of the planter to determine the fact of the planting operation being properly started to make the cross-rows in alinement. If the marker-fingers are found not to be properly adjusted to secure the desired result, they are readily altered to secure such result by raising the shaft 17, the finger-wheels, and other parts associated therewith and rotating said parts until the marker-fingers are brought to the proper positions to register with the marks previously made by them.

40 is a return-spring that connects the valve-operating shaft 13 to the frame of the planter and by which said shaft is returned to its normal position after each valve-operating action.

41 designates marker-fingers loosely mounted upon the shaft 17 at or adjacent to its extremities. These marker-fingers are adapted to drag upon the ground to produce lines therein at distances from the sides of the planter corresponding to widths of the spaces between the rows planted and to be planted by the planter in order that the operator of the machine may follow said lines as guides in planting succeeding rows.

I claim—

1. In a corn-planter, the combination of seed-dropping mechanism, a rotatable shaft provided with means for operating said seed-dropping mechanism, a spacing-wheel fixed to said shaft, a carrier-frame loosely fitted to said shaft, a runner secured to said carrier-frame and associated with said spacing-wheel, a furrow-opener, and flexible means of connection between said furrow-opener and said runner, substantially as set forth.

2. In a corn-planter, the combination of seed-dropping mechanism, a rotatable shaft provided with means for operating said seed-dropping mechanism, a spacing-wheel fixed to said shaft, a carrier-frame loosely fitted to said shaft, a runner secured to said carrier-frame and associated with said spacing-wheel, a furrow-opener, flexible means of connection between said furrow-opener and said runner, and a stay for holding said carrier-frame in upright position, substantially as set forth.

ANTON DUBACH.

In presence of—
FERD DUBACH,
ALBERT J. DUBACH.